Feb. 22, 1944.   W. I. GLADFELTER ET AL   2,342,189
CONVEYING AND TRANSFER MECHANISM
Filed July 25, 1940   10 Sheets-Sheet 5
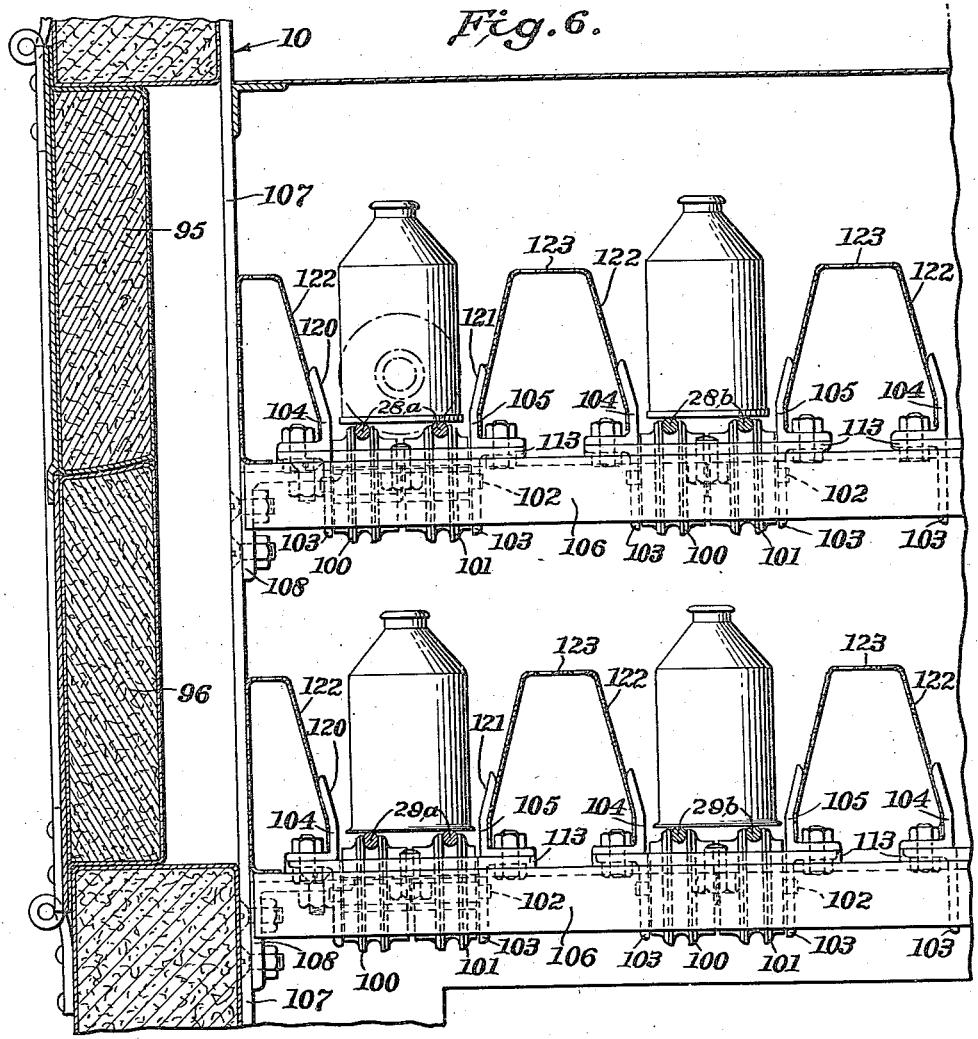
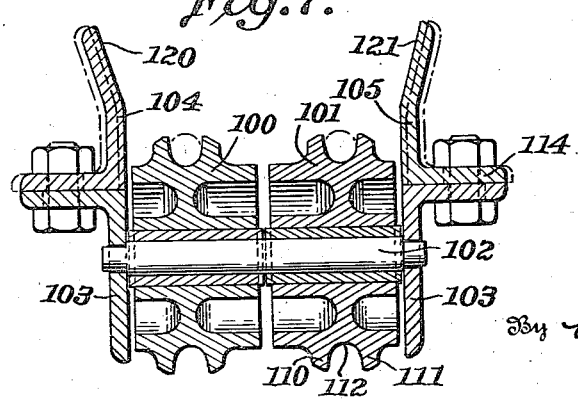

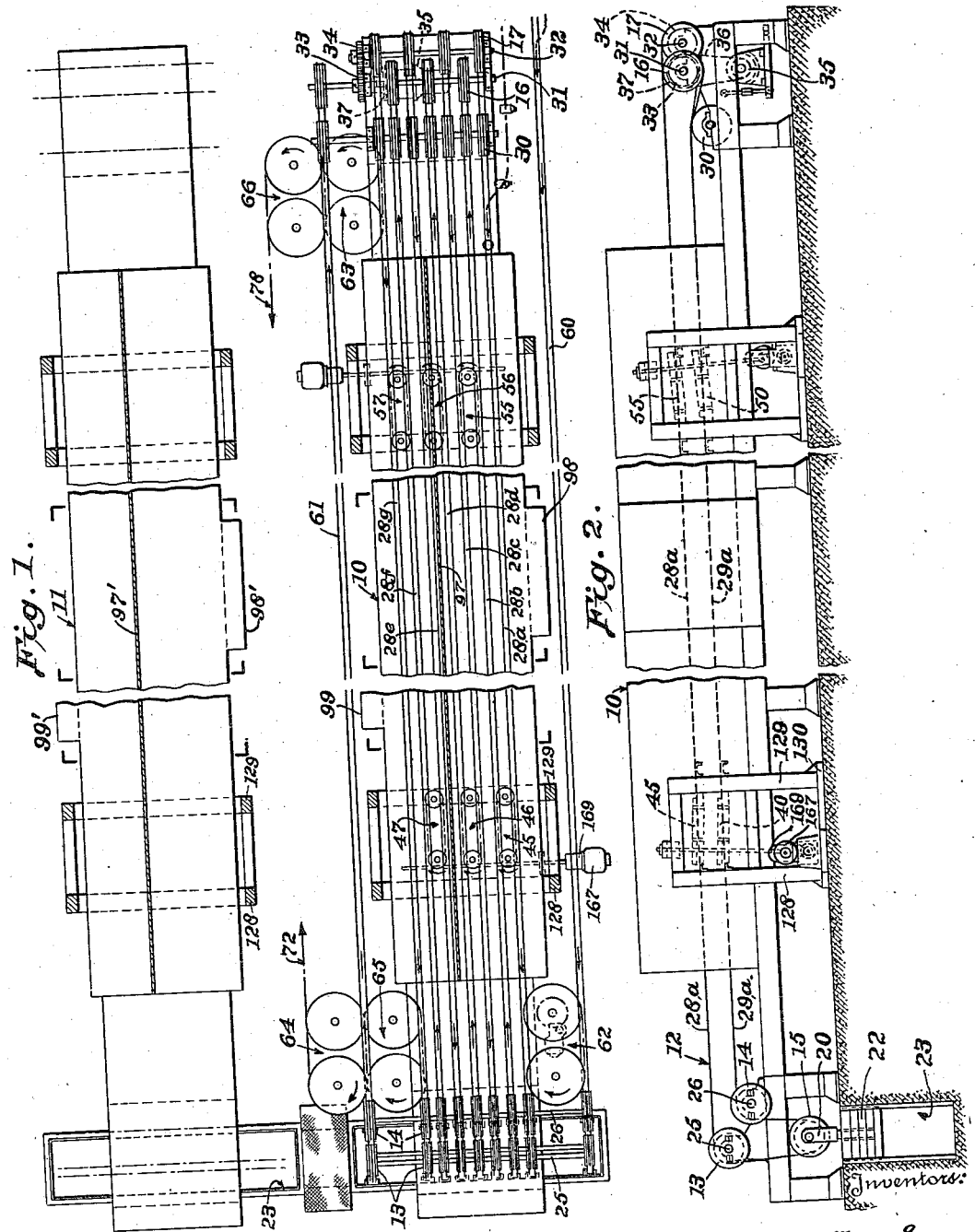
Feb. 22, 1944.　　W. I. GLADFELTER ET AL　　2,342,189
CONVEYING AND TRANSFER MECHANISM
Filed July 25, 1940　　10 Sheets-Sheet 1
Inventors:
Wiltie I. Gladfelter,
William H. Moore,
Attorneys.

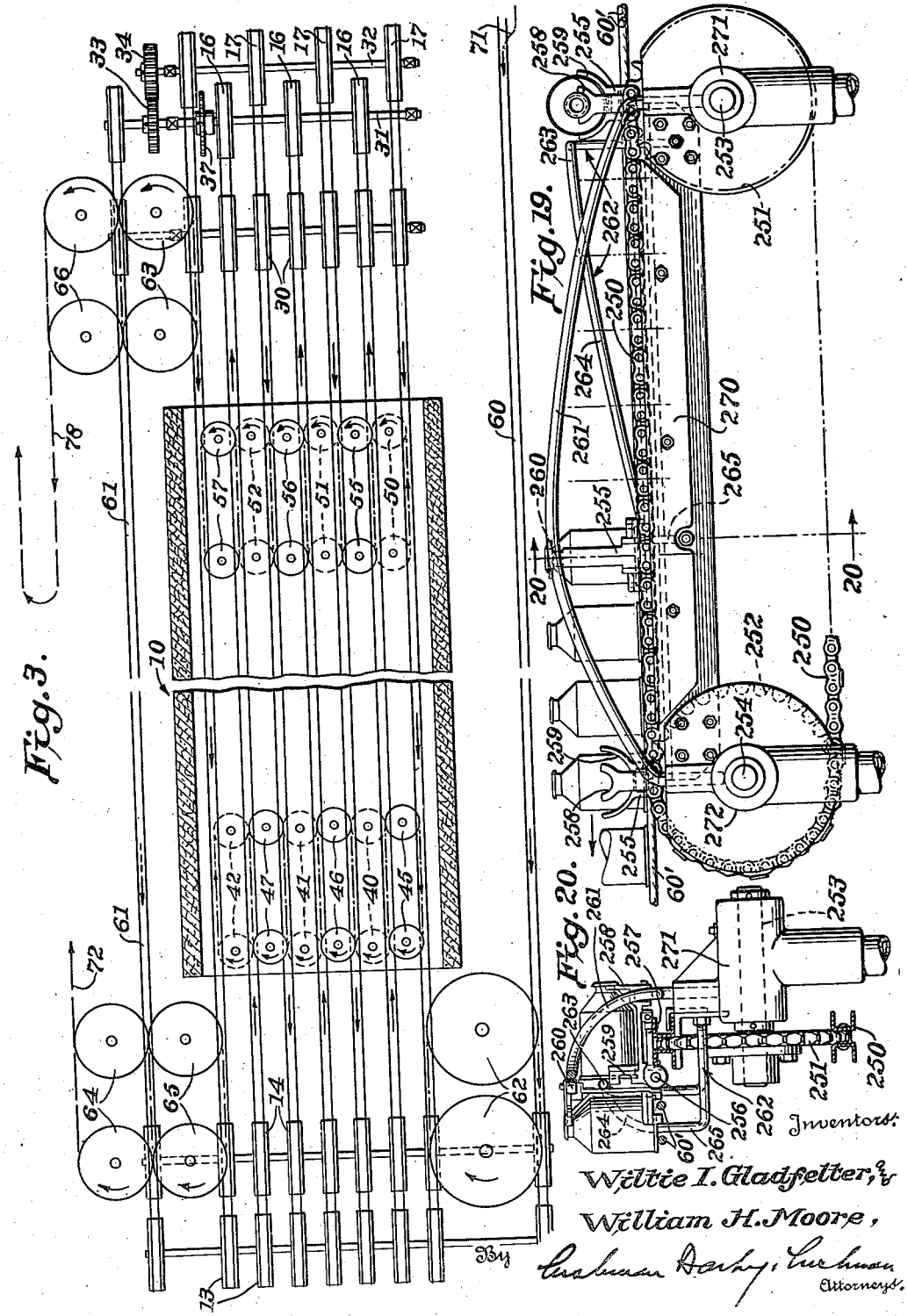

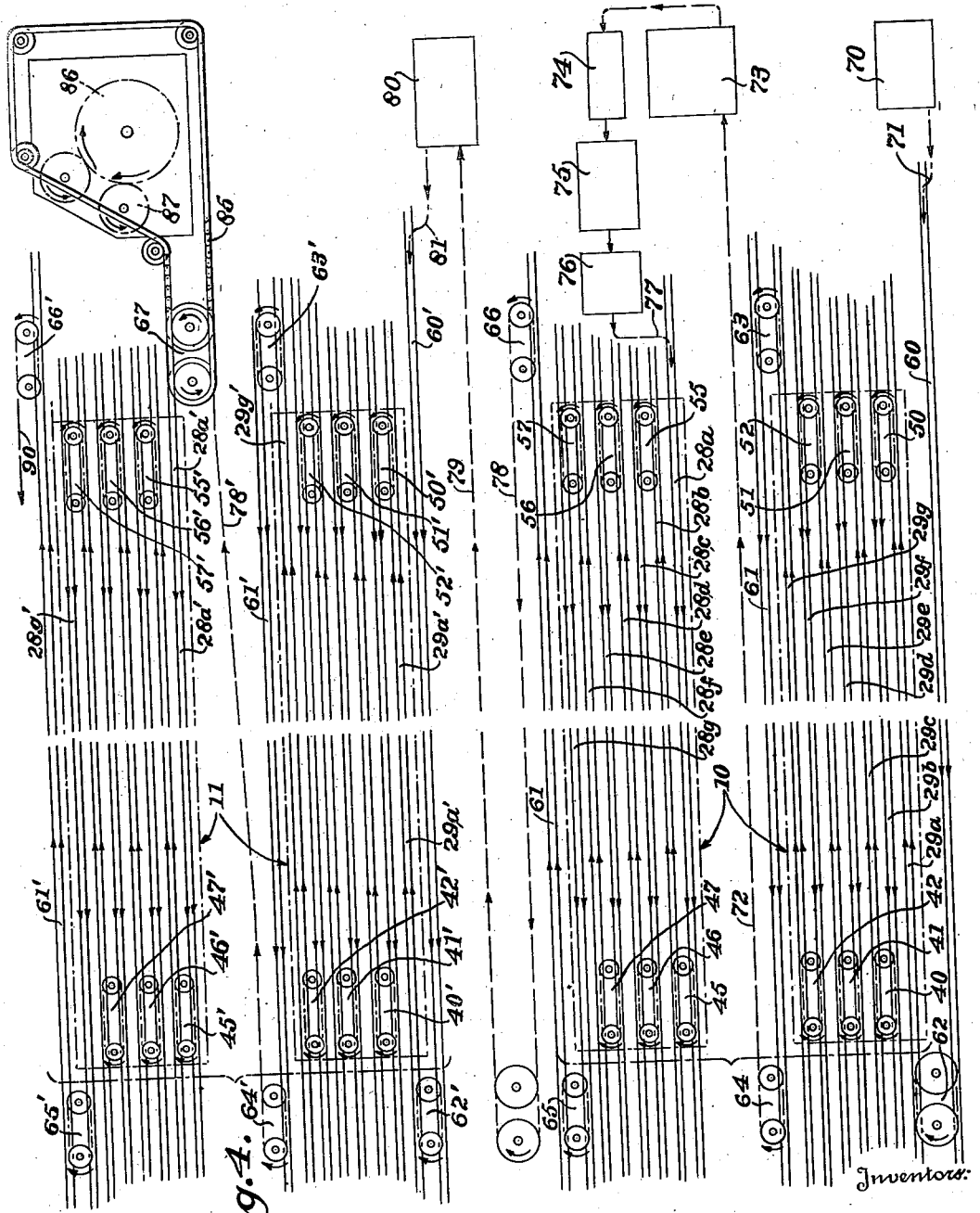

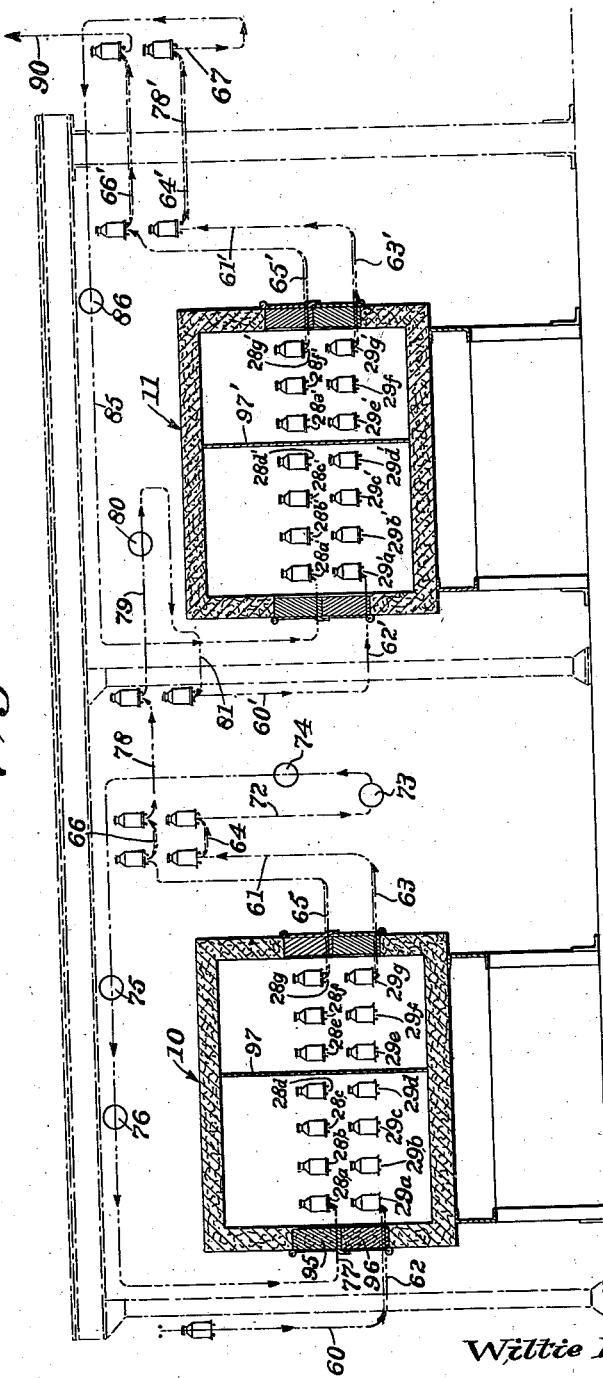

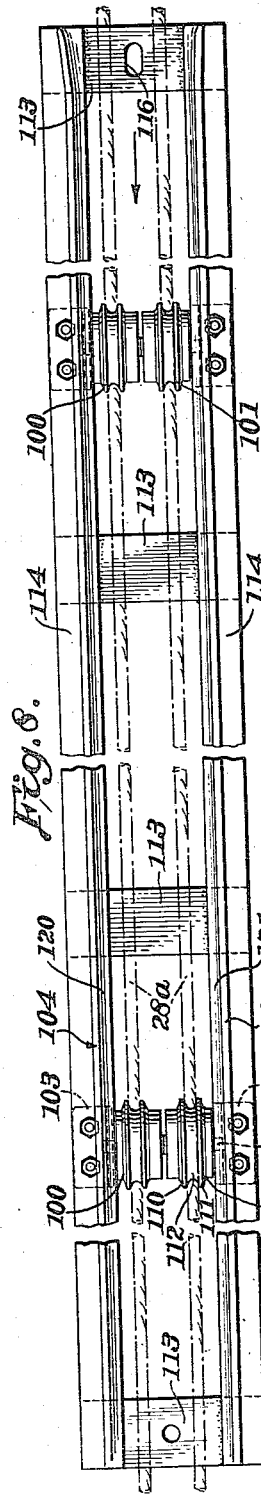
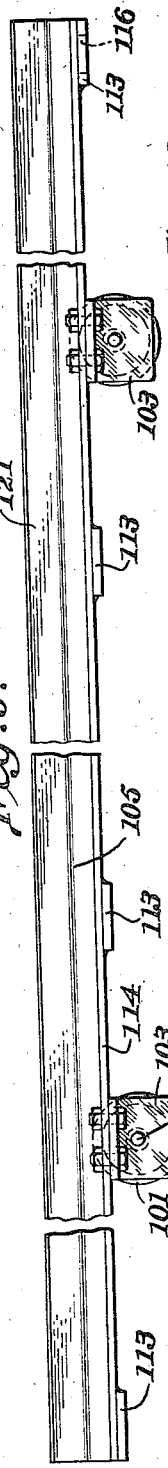
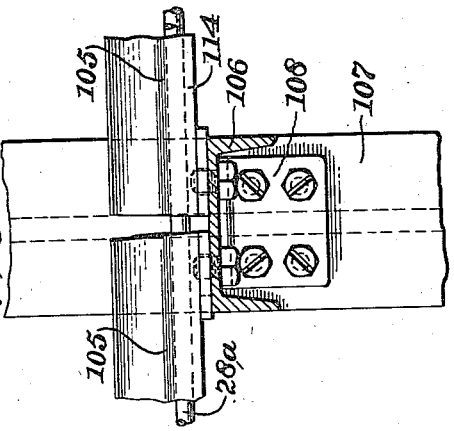
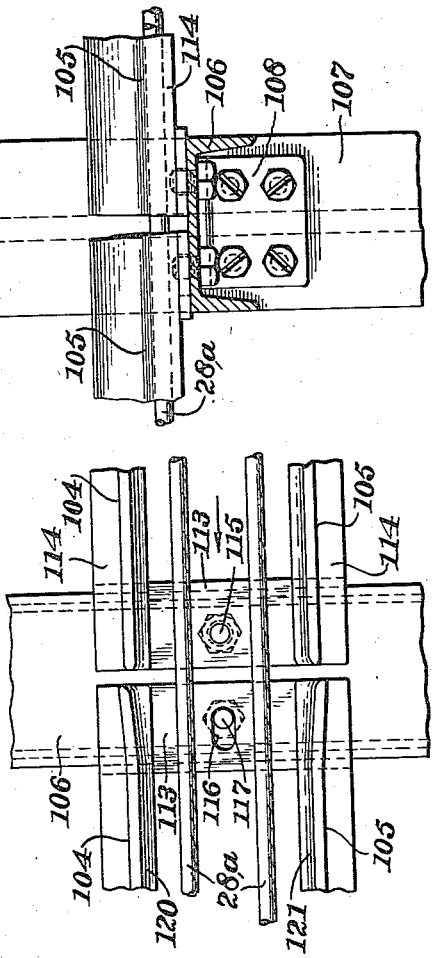
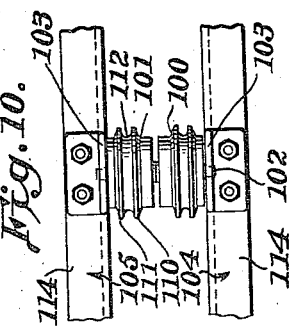

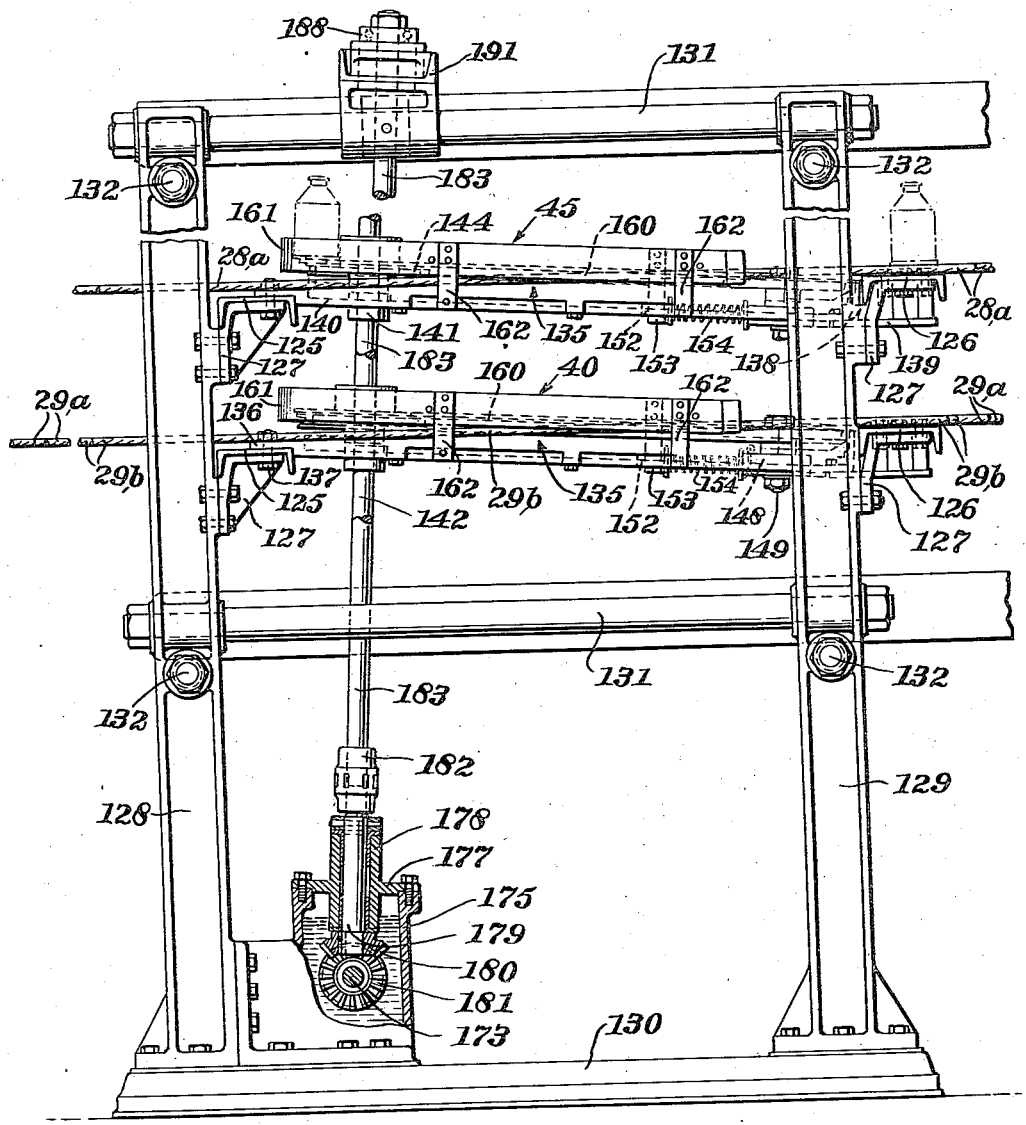

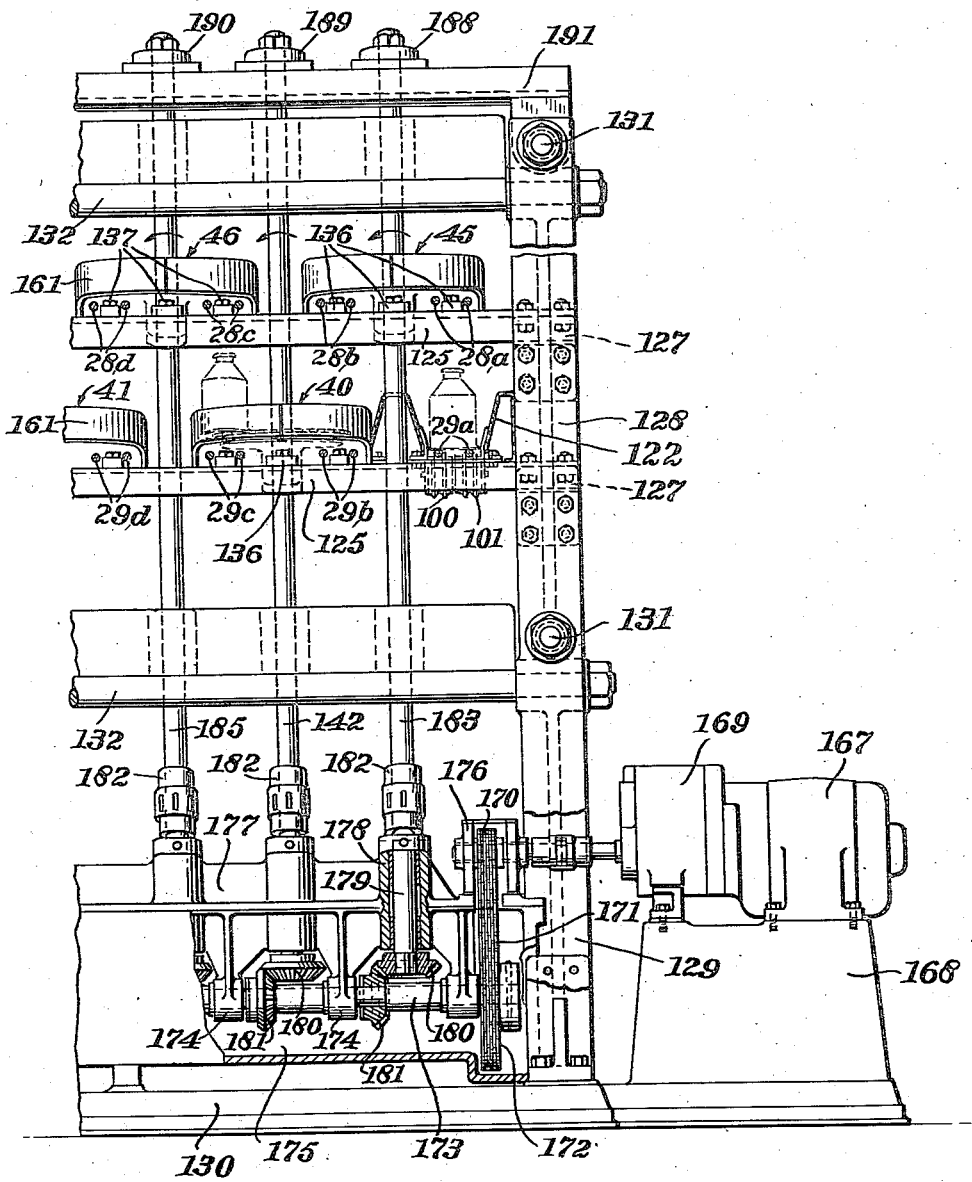

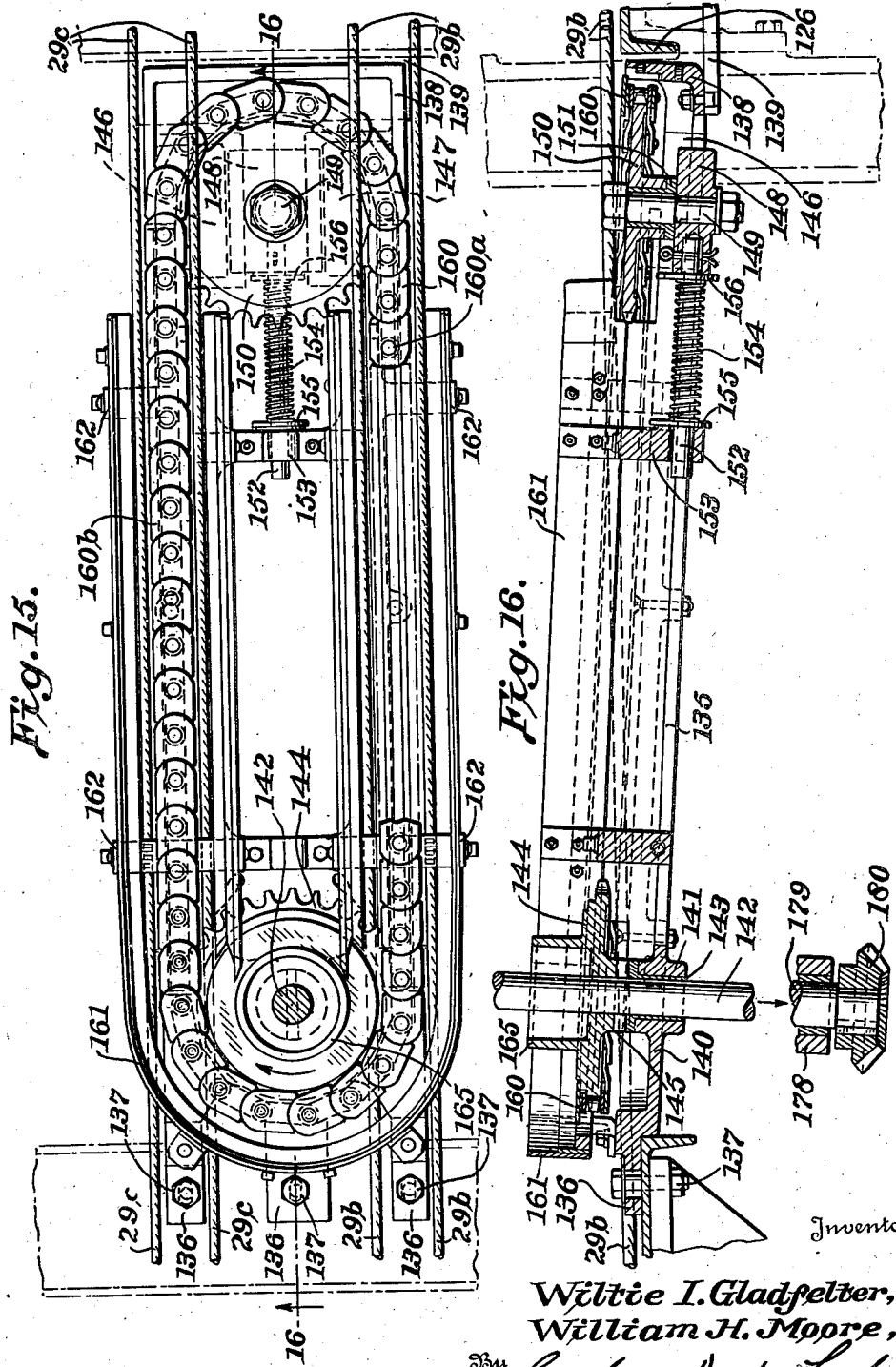

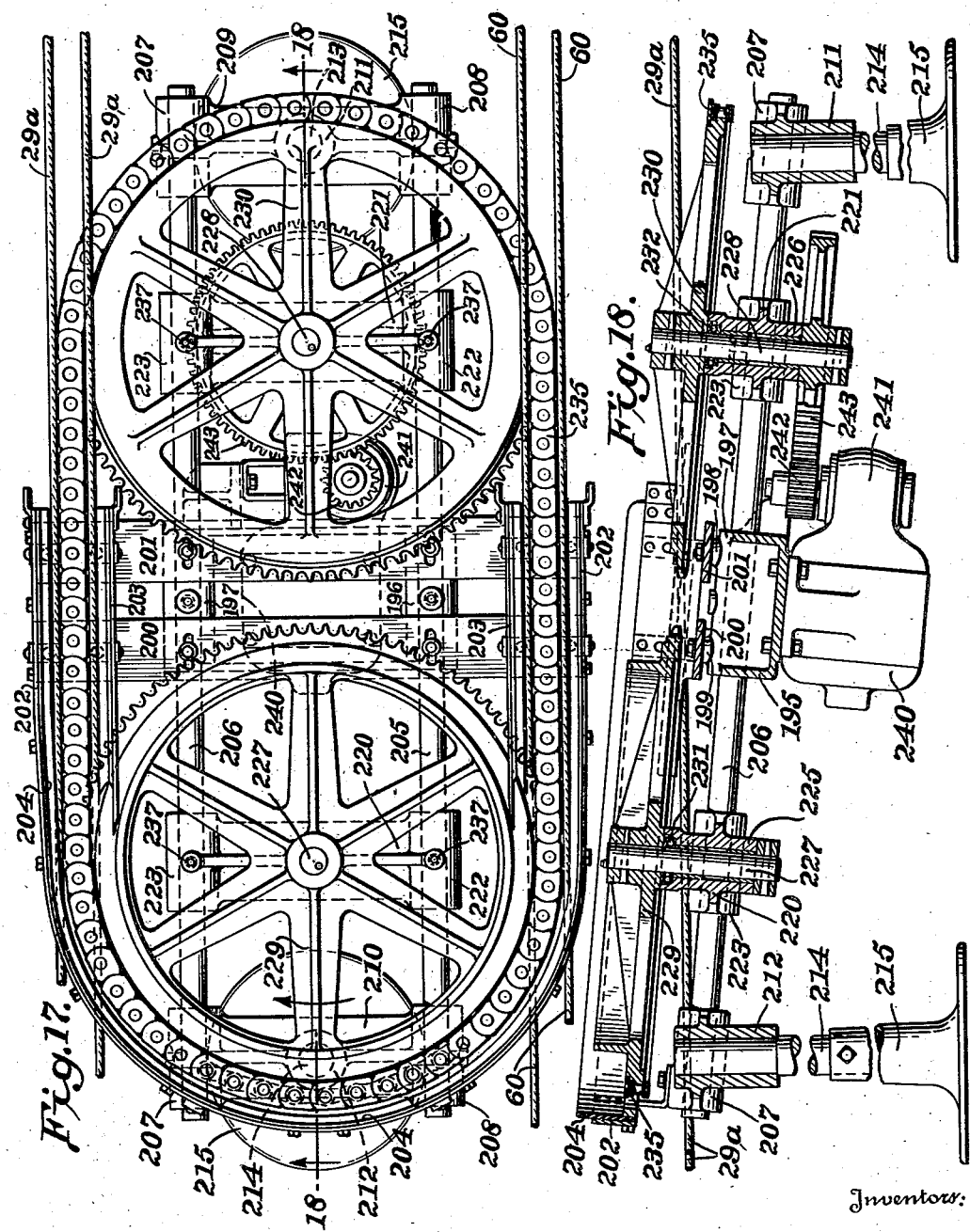

Patented Feb. 22, 1944

2,342,189

UNITED STATES PATENT OFFICE 2,342,189

CONVEYING AND TRANSFER MECHANISM

Wiltie I. Gladfelter and William H. Moore, Philadelphia, Pa., assignors to Crown Cork & Seal Company, Inc., Baltimore, Md., a corporation of New York Application July 25, 1940, Serial No. 347,564

8 Claims. (Cl. 198—20)

The present invention relates to the manufacture of coated articles and to novel methods of and means for drying or baking the coatings on such articles.

It is an object of the invention to provide means for and methods of applying a plurality of coatings to articles of manufacture and baking or drying the several coatings successively, between the coating operations. To this end, the invention provides a novel sequence of coating and baking steps and a novel combination of coating instrumentalities, baking ovens, and article handling means.

More particularly, the modification of the invention disclosed herein relates to the manufacture of containers, such as drawn, seamless cans, which are internally and externally coated with heat-hardening coating materials, such as enamel, lacquer, printing ink, varnish or the like.

It is an object of the invention to provide machines for and methods of internally coating a line of containers, baking the coating material, externally coating the containers, baking that coating, then decoratively printing the exterior surface of the containers, baking or drying, preferably at a lower temperature, the decoration, then applying a protective coating of varnish or other substantially transparent coating material to the printed surfaces of the containers, and finally baking or drying the last-mentioned coating.

It is a further object of the invention to perform these several steps automatically and with extreme rapidity, so that a continuous can manufacturing line may be accommodated.

It is a further object of the invention to provide novel baking ovens and novel means for conveying a line of containers therethrough in a continuously moving, serpentine path, whereby the articles remain in the oven for a predetermined time.

It is a further object of the invention to provide means for accommodating in a single baking oven, two lines of coated articles, coming from different coating instrumentalities and following, in the oven, separate and distinct paths of movement, preferably at different elevations in the oven.

It is a further object of the invention to provide means for subjecting the containers to two relatively high temperature baking operations and, thereafter, to two baking operations at a lower temperature. To this end, the invention provides novel transfer and conveying means, whereby the articles successively pass through two different portions of two ovens, one oven being maintained at a high temperature and the other at a lower temperature, each pass through each oven being preceded by a particular coating operation.

It is a further object of the invention to provide simplified conveying means for the ovens, so arranged that both the upper and lower runs of endless conveyors are active runs, one handling articles from one coating machine and the other from another machine.

It is a further object of the invention to provide improved means for transferring a line of articles from one run of one endless conveyor to the adjacent run of another conveyor, for movement therewith in the opposite direction in the oven.

It is a further object to provide novel driving means for such transfer devices.

A further object of the invention is to provide improved means for supporting, guiding, tensioning and driving a plurality of endless conveyors, such as endless cables.

Other and further objects of the invention will be apparent to one skilled in the art from a consideration of the following description of a preferred embodiment of the invention, shown in the drawings, in which:

Figure 1 is a diagrammatic plan view of a pair of ovens in accordance with the invention, with sections broken away.

Figure 2 is a diagrammatic side elevation of the apparatus shown in Figure 1.

Figure 3 is a somewhat enlarged, diagrammatic plan of one of the ovens shown in Figures 1 and 2.

Figure 4 is a diagrammatic plan layout of the coating instrumentalities and the conveyors in the upper and lower tiers of the ovens.

Figure 5 is a diagrammatic transverse vertical section through a pair of ovens, showing diagrammatically the directions and paths of movement of the containers.

Figure 6 is an enlarged transverse sectional view through one oven.

Figure 7 is a vertical section through a pair of cable supporting rolls and associated elements.

Figure 8 is a top plan of a guide rail assembly unit and cable supporting rollers.

Figure 9 is a side view thereof.

Figure 10 is a bottom plan showing a detail of Figures 8 and 9.

Figures 11 and 12 are top plan and side elevational views, showing the manner in which the guide rail units are supported in the oven.

Figure 13 is a side elevation, with certain parts in section showing the transfer tables at one end of the oven.

Figure 14 is an end elevation and partial section of the same.

Figure 15 is a plan view, on an enlarged scale of one of the transfer tables.

Figure 16 is a vertical section on line 16—16 of Figure 15.

Figure 17 is a plan view of another form of transfer table, adapted to be positioned exteriorly of the oven.

Figure 18 is a vertical section on line 18—18 of Figure 17.

Figure 19 is a side elevation of a tilting bracket transfer chain assembly, and

Figure 20 is a transverse vertical section taken substantially on line 20—20 of Figure 19.

General organization

As shown in Figure 1, a pair of longitudinally elongated ovens 10, 11, positioned side by side have a plurality of endless cables extending therethrough and trained about appropriate guiding, tensioning and driving sheaves. The conveyors 12 are preferably in the form of pairs of endless cables, each pair being trained about guide sheaves 13, 14 and about a weighted tension pulley 15 at one end of each oven and about driving sheaves 16 or 17 at the other end. Each tension pulley 15 is journalled in a bracket 20 mounted upon a counterweight assembly 22, which, for convenience, may be disposed within a pit 23 in the plant floor. Preferably, each tension pulley 15 and the counterweights associated therewith are independent from all of the others, so that an equal tension is applied to each pair of cables or other conveying means. Likewise, the guiding sheaves 13, 14 are journalled for independent rotation relative to their shafts 25, 26.

The cables are guided for movement through the ovens 10, 11 in parallel relation, providing upper runs 28a—28g and lower runs 29a—29g, the functions of which are described below. Each lower run passes over a guiding sheave 30 at the drive end and over the driving sheaves 16, 17 fixed upon driving shafts 31, 32, journalled for rotation in appropriate bearings at the drive end and carrying intermeshing spur gears 33, 34, whereby the shafts and the sheaves carried thereby rotate in opposite directions, the shaft 31 being driven from a motor-reducer 35 through a chain 36 and sprocket 37.

As shown in Figure 1, the several driving sheaves 16, 17 are disposed in staggered relation to each other and alternate conveyors or pairs of cables are trained about the sheaves on the different shafts, with the result that adjacent conveyors or pairs of cables are driven in opposite directions. Of course, the upper and lower runs of each conveyor or pair of cables move in opposite directions.

Interiorly of the oven chamber, there are a plurality of transfer tables adapted to transfer a line of articles from one conveyor to the next adjacent one for movement thereon, in a direction opposite to its movement on the first conveyor. Adjacent the tension end of the ovens, there are a plurality of transfer tables 40—42 associated with the lower runs 29a—29g, while a similar set of transfer tables 45—47 are associated with the upper run, the latter being positioned in staggered relation to the former. Similarly, adjacent the drive end, there are a plurality of transfer tables 50—52 in alignment with the lower runs of the conveyors and transfer tables 55—57 associated with the upper runs, the latter being in staggered relation to the former, for purposes hereinafter described.

Along the sides of the oven there are positioned two endless conveyors 60, 61 having upper and lower runs and trained about appropriate sheaves on extensions of the shafts 25, 26 and 31, the conveyor 60 being extended beyond the drive end and trained about an appropriate sheave, not shown. An exteriorly disposed transfer table 62 is positioned between the lower run of the conveyor 60 and the lower run 29a of the first oven conveyor, while a similar transfer table 63 is positioned between the lower run 29g of the last oven conveyor at the drive end and the lower run of the outside conveyor 61 which serves as a cooling conveyor for the heated articles. At the opposite end of the lower run of the conveyor 61, another exteriorly disposed transfer table 64 removes the line of containers and transfers the same to a conveyor 72 which leads them to the next machine in the line.

An exteriorly disposed transfer table 65 is positioned adjacent the tension end, between the upper run 28g of the last oven conveyor and the upper run of the cooling conveyor 61, while a similar transfer table 66 removes the containers from that run adjacent the driven end and deposits them upon a conveyor 78, leading to storage or to the next coating apparatus in the line.

The second oven 11 is provided with similar conveyors and transfer tables, represented by corresponding prime numbers, and the arrangement is substantially the same as that just described, with the exception that a rather special transfer table 67, described below, is provided for the delivery of cans to the upper run of the first conveyor in the second oven.

Referring to Figure 4, a line of containers is delivered from an inside spray machine, represented diagrammatically at 70, by a special tilting conveyor 71 (described below) to the lower run of the exterior conveyor 60. The containers, standing upright on the cables 60, are transferred by the transfer table 62 to the lower run 29a of the first oven conveyor. The cans move toward the right of that conveyor until they reach the transfer table 50, whereupon they are transferred to the lower run 29b of the next conveyor. The containers move in the opposite direction thereon until they are transferred by the table 40 to the run 29c of the next conveyor, whereupon they continue their back and forth movement on the lower runs 29d, 29e, 29f and 29g, being transferred by the tables 51, 41, 52, 42, respectively, in that order. As they emerge from the oven chamber on the lower conveyor run 29g, they are transferred by the table 63 to the lower run of the cooling conveyor 61, where they may be subjected to blasts of cooling air. Finally, they are transferred from the lower run of the conveyor 61 by the transfer table 64 to any appropriate type of conveyor, represented diagrammatically at 72, which carries them to the next machine in the line, for instance, a bottom seamer 73, which applies the bottom end members to the interiorly coated, drawn seamless containers. A suitable seamer is shown in the application of Gladfelter and Moore, Serial No. 349,862, filed August 2, 1940.

They may then pass through a pressure testing machine, represented diagrammatically at 74, where they are tested for defects in the seam and neck, and rejected if defective. In the preferred arrangement, the next machine in the line is an outside roll coating machine, represented generally at 75, which may be similar to that shown in the pending application of Gladfelter and Moore, Serial No. 345,668, filed July 15, 1940. This machine applies to the outside cylindrical surface of the containers, a uniform coating of a heat-hardening material, such as enamel, lacquer or the like. They are then transferred to and through a cone-spraying machine 76, which sprays a coating of similar material upon the conical upper ends of the containers. From this machine the cans are deposited by a chain 77 of the type shown in Figures 19 and 20, onto the upper run 28a of the first oven conveyor, on the exteriorly disposed continuation thereof. This run carries the cans toward the tension end (toward the left in Figures 1 and 4) until they reach the upper transfer table 45. They then move back and forth with the runs 28b, 28c, 28d, 28e, 28f and 28g, being transferred successively by the tables 45, 55, 46, 56, 47 and 57. From the exterior continuation of the upper run 28g of the last oven conveyor, the containers are transferred by the exteriorly disposed transfer table 65 to the upper run of the cooling conveyor 61, upon which they move in the opposite direction, past cooling air blasts, if desired. A transfer table 66 deposits them upon appropriate conveying means such as that indicated at 78, 79 in Figure 4. This conveyor may be elongated to provide a reserve supply of containers between the first and second baking ovens. In fact, the interiorly and exteriorly coated cans may be conveyed to storage from the first oven and similar cans taken from storage, or elsewhere, by any appropriate conveyor to the automatic printing machine, represented diagrammatically at 80. This machine may be similar to that shown in the application of Gladfelter and Hauger, Serial No. 342,568, filed June 26, 1940. A conveyor chain 81 having tilting brackets associated therewith receives the cans in horizontal relation from the printer and deposits them upon their bottoms in upright relation upon the lower run of the exteriorly disposed conveyor 60' associated with the second oven 11. The printed cans are transferred to the lower run 29a' of the second oven by the exteriorly disposed transfer table 62' and move through the oven on the lower tier in a serpentine path in the manner previously described in connection with the first oven 10. The transfer table 63' removes them from the lower run of the last oven conveyor 29g' and places them upon the lower stretch of the cooling conveyor 61' where they are carried to the transfer table 64', which delivers them to a conveyor 78', leading upwardly over appropriate guide sheaves to the transfer table 67 disposed at the elevation of the upper runs of the conveyors in the second oven. A chain 85 acts jointly as the transfer chain of the table 67 and as an infeed and an outfeed conveyor for an outside varnish spraying machine 86, which may be similar to that shown in the application of Gladfelter and Hauger, Serial No. 345,832, filed July 16, 1940, and which applies an even coating of varnish to the exterior surfaces of the cans, including the surface having the baked, printed decoration thereon. The chain 85 takes the cans from an outfeed dial 87 of the varnish machine and transfers them to the upper flight 28a' of the first oven conveyor.

The containers follow a serpentine path with the upper runs of the several oven conveyors until they are finally transferred by the exteriorly disposed transfer table 65' to the upper run of the cooling conveyor 61'. The transfer table 66 delivers them to an appropriate conveyor 90 which carries them to the next machine in the line, such as an inside waxing machine which may be of the type shown in the applications of Goebel and Rau, United States Patent No. 2,257,740, dated October 7, 1941, as modified by the application of Gladfelter and Duhan, Serial No. 348,306, filed July 29, 1940.

The interior baking chamber of the first oven 10 is preferably maintained at a relatively high temperature, such as 450° F. The coatings applied by the inside spray machine and the outside coating machines are relatively heavy and are of a material that requires a relatively high baking temperature. The temperature maintained in the interior of the second oven 11, however, is preferably considerably lower, in the neighborhood of 250° F. This relatively low temperature has no deleterious effect upon the previously baked coatings applied prior to the passes through the first oven, but is sufficiently high to bake satisfactorily the relatively thin decorative coating of differently colored inkings applied by the automatic printer 80. Moreover, it is sufficient to volatilize the solvents in the varnish applied by the outside spray machine 86 and to thoroughly dry and harden the varnish.

It will thus be seen that the general organization of the elements of the present invention, and the steps followed, provide novel means for and methods of coating articles of manufacture, such as containers and the like. As far as the general arrangement is concerned, it must be understood that the invention is not limited to the exact combination or relative position of parts shown diagrammatically in the accompanying drawings and described above, but covers all equivalents coming within the scope of the appended claims.

*Oven and cable conveyor structure*

The side, top and bottom walls of the baking ovens may be of any approved, insulated construction, supported upon a conventional base. Preferably, the side walls have hinged doors 95, 96 suitably spaced along the length thereof to enable the operators to gain access to the interior of the ovens when desired. Partitions 97 divide the oven into two longitudinally extending chambers, isolated from each other. This is desirable to prevent the volatile solvents, driven off from the coatings on the containers in the section of the chamber first encountered by the coated cans, from coming in contact with the relatively dry, baked coatings on the containers in the final drying and baking stage. Any appropriate heating means and ventilating means may be employed, such as the ducts, represented diagrammatically at 98, 99.

As pointed out above, the endless conveyors 12 preferably comprise a plurality of pairs of endless cables trained about guiding, tensioning and driving sheaves at the respective ends of the oven. As indicated in Figures 6–12, the pairs of cables constituting the runs 28a, 29a, 28b, 29b, etc., are supported for movement through the oven upon a plurality of pairs of upper and lower rollers 100, 101, journalled for rotation upon pins 102 carried by depending brackets 103 supported from longitudinally extending guide rails 104, 105, the latter being supported at their ends upon transverse channel members 106, secured to the side frame elements 107 of the furnace by appropriate angle members 108. The rollers 100, 101 are provided with outwardly projecting, spaced ribs 110, 111, having bevelled ends and defining therebetween grooves 112 for the cables to be supported.

The guide rails 104, 105 and a plurality of cable supporting rolls 100, 101 preferably are made up in pre-assembled units and secured together by transverse connecting plates 113, welded at suitably spaced intervals to the bottom flange 114 of each rail. One end plate 113 is adapted to be bolted in fixed relation to one of the transverse channels 106 by a bolt 115 or the like, while the other end is provided with a slotted opening 116 through which a bolt 117 secures it to a supporting channel, the elongated slot being provided to permit expansion and contraction of the rail sections upon changes in temperature. As indicated in Figure 11, the ends of the rail sections are spaced apart to permit such expansion.

The upper ends of the guide rails 104, 105 are preferably flared outwardly somewhat, as indicated at 120, 121, and elongated, perforated sheet metal guard elements 122, are secured to the back faces thereof. The guards have side walls inclined upwardly and outwardly away from the adjacent containers and a substantially horizontal top wall 123, which eeffectively prevent cans from getting caught between adjacent guide rails of adjacent pairs, which might cause a jam in the oven. The perforations permit free circulation of air and heated gases through the oven, so that the baking conditions may be accurately controlled.

The transfer tables

The transfer tables 40—42, 45—47, 50—52 and 55—57 disposed interiorly of the oven chamber are supported by transverse channels 125, 126 carried by brackets 127 bolted to the vertical frame members 128, 129 supported upon a suitable base 130 and held in predetermined spaced relation by longitudinal and transverse tie rods 131, 132. In Figures 13 and 14, the group of tables adjacent the tension end of the oven 10 are shown, but it will be understood that the supporting and driving means for the tables adjacent the drive end of the oven will be similar.

Each transfer assembly comprises a unitary frame 135 having longitudinally projecting apertured lugs 136 at its rear end for attachment by bolts 137 to a channel 125. At its forward end portion 138 the frame is secured upon a plate 139 carried by the other channel 126. Adjacent the first-mentioned, rear end, the floor 140 of the frame is provided with a hollow sleeve 141, in which a bearing 143 is mounted. A shaft 142, journalled for rotation in the bearing, has a sprocket 144 fixed thereon and supported by bearing 145 between the upper end of the sleeve 143 and the lower face of the sprocket. At its other end, the frame is provided with inwardly projecting flanges 146, 147, providing a longitudinal slideway for a block 148 carrying a stub shaft 149, upon which a second sprocket 150 is journalled for rotation, an appropriate bearing 151 being interposed between the shaft and the sprocket. The slidable block 148 is connected to a rod 152, the other end of which is disposed in a guiding aperture in a cross-bar 153 of the table frame. A coil compression spring 154, surrounding the rod 152, is interposed between washers 155, 156 bearing against the faces of the slidable block and the cross-bar 153, whereby the sprocket 150 is constantly urged, under predetermined pressure by the spring 154, away from the sprocket 144, to maintain the desired tension in the chain 160, trained about the two sprockets.

A guide plate 161, carried by upwardly projecting brackets 162, secured to the frame 135, extends along the path of movement of the chain, to prevent inadvertent dislodgement of containers carried thereby, as hereinafter explained.

It will be noted, by reference to Figures 13 and 16, that the transfer table frame 135, the sprockets and the transfer chain are disposed upon a plane inclined to the horizontal. The forward sprocket 150 is disposed below the plane of the parallel conveyor cables, for instance, the cables 29b, 29c. The other sprocket 144, however, is disposed at an elevation above the plane of the cables. One run 160a of the transfer chain 160 passes upwardly between the pair of cables indicated at 29b, while the other run 160b passes downwardly on an inclined plane between the pair of cables 29c. The sprockets and the transfer chain are driven, as hereinafter explained, in a direction to cause the runs of the chain to move with the pairs of cables through which they pass. Hence, the run 160a, moving with and passing upwardly between the cables 29b, will lift the containers therefrom, transfer them around on a path following the periphery of the sprocket 144 and then deposit them upon the cables 29c, as the chain moves with those cables and passes downwardly therebetween. The guard 161, which follows the chain around the sprocket, prevents articles falling off the chain, for instance, under the influence of centrifugal force, and an upstanding collar 165 integral with the sprocket 144 prevents the cans from tipping inwardly.

Adjacent each transfer table supporting frame structure, there is a motor 167, supported upon a suitable base 168 and connected, through a speed reducer 169, to a sprocket 170, having a chain 171 trained thereon and connected to a sprocket 172, fast upon a main transverse drive shaft 173. The shaft 173 is journalled in bearings 174 in a transversely extending casing 175 which also encloses the sprocket 172 and the lower portion of the chain 171, the motor sprocket 170 being suitably housed in an upward extension 176 thereof. A special casting 177, having a plurality of substantially vertically disposed bearing sleeves 178, closes the upper side of the housing 175. Stub shafts 179, journalled in the bearings 178, carry pinions 180 at their lower ends in mesh with similar pinions 181 on the transverse shaft 173. At their upper ends, the stub shafts 179 are connected by coupling members 182 to upwardly projecting drive shafts 183, 142, 185; etc., as shown in Figure 14. The shafts extend upwardly on parallel axes inclined slightly with respect to the vertical and are journalled at their upper ends in bearings 188, 189, 190, etc., the bearings being carried by an upper, transverse channel 191 of the transfer table supporting framework.

The first drive shaft 183 extends upwardly between the pairs of cables 29a, 29b and is connected to the upper sprocket 144 of the transfer table 45 associated with the upper cable runs 28a, 28b. The next drive shaft 142 is connected to the sprocket 144 of the transfer table 40, as indicated in Figures 14, 15 and 16, while the shaft 185 drives the corresponding sprocket of the next, upper transfer table 46. This arrangement is continued entirely across the oven and adjacent shafts drive, alternately, upper and lower transfer tables which are positioned in staggered relation across the oven.

As indicated in Figure 13, the housing 175 is maintained substantially full of oil to supply lubricant to the bearings 174 and the pinions 180, 181. The shaft 173 is driven by the motor 167 and speed reducer 169 at such a speed as to cause the transfer sprocket chains 160 to move at a speed corresponding to the speed of movement of the conveyor cables in the oven. Hence, a smooth transfer of containers from the cables to the chain and vice versa is effected.

The outside transfer tables

The outside transfer tables are quite similar to those just described, the principal differences being in their relative dimensions, supporting means and driving means. Since the outside conveyors are usually spaced a greater distance laterally from the adjacent inside conveyors than the several pairs of inside conveyors, the sprockets of the outside transfer tables are of greater diameter to effectuate this increased lateral movement. Moreover, because of their manner of use, the supporting means are adjustable and each unit has a separate driving motor. Referring to Figures 17 and 18, each outside transfer table comprises a transverse, inverted channel casting 195 having at its ends integral hollow sleeves 196, 197, provided with upstanding bosses 198, 199, to which a pair of transversely extending plates 200, 201 are bolted, the latter being extended laterally and providing supporting means for guide plates 202, 203, which may be lined with Bakelite strips 204, or the like. The sleeves 196, 197 of the channel casting 195 are supported upon longitudinally extending rods 205, 206, which, in turn, are supported in similar sleeves 207, 208 carried by transverse end members 209, 210, the latter having vertically disposed sockets 211, 212 adapted to receive the ends of vertically disposed, adjustable legs 213, 214, supported by floor pedestals 215. Thus, the table frame, in this case, is made up of the transverse members 195, 209, 210 and the longitudinal rods 205, 206.

Transversely extending brackets 220, 221, provided with sleeve-like ends 222, 223, slidably mounted on the rods 205, 206 have upwardly and downwardly projecting hollow bosses 225, 226 associated therewith, in which stub shafts 227, 228 are journalled for rotation. Sprockets 229, 230 are fixed upon the upper ends of the shafts and are journalled upon thrust bearings 231, 232 interposed between the sprockets and the bosses.

As indicated in Figure 18, the axes of shafts 227, 228 are inclined somewhat to the vertical and the sprocket 230 is disposed below the pairs of cables 60 and 29a, for instance, while the sprocket 229 is disposed thereabove. The sprocket chain 235, trained about the sprockets, passes upwardly on an inclined plane between the two cables 60 and downwardly between the cables 29a, to transfer a line of containers from the first pair of cables to the second, as previously described in connection with the inside transfer tables. The proper tension is maintained upon the chain by adjusting the positions of the brackets 220, 221 and securing them against movement by set screws 237.

A motor 240, bolted to the lower face of the transverse channel casting 195, is provided with a speed reducing assembly 241, driving a pinion 242, in mesh with a spur gear 243 carried by the lower end of the stub shaft 228, whereby rotation is imparted to the sprocket 230 and, through the chain 235, to the other sprocket.

It will be apparent that this construction of transfer table may be associated with the upper and lower runs of the various conveyors, simply by providing legs 214 of appropriate length. Moreover, the transfer assembly may be changed to accommodate different spacings of adjacent conveyors, simply by substituting smaller or larger sprockets 229, 230 for the ones shown in Figures 17 and 18 and by making corresponding changes in the transfer chain and the guide rails. As indicated in Figures 3 and 4, the outside transfer tables 64, 65 and 66 have sprockets of smaller diameter than the table 62, since the adjacent conveyors are more closely spaced than the conveyors 60 and 29a. Hence, smaller sprockets than those shown in Figures 17 and 18 should be employed.

The motor 240 and the speed reducer 241 are so adjusted that the sprockets are driven at a rate to make the speed of the chain correspond to the speed of movement of the associated cable conveyors, to effect a smooth transfer of the articles.

The tilting bracket transfer chain

In Figures 19 and 20, a tilting bracket transfer chain assembly is shown, of a type that may be used at 71, 77 or 81 in Figure 4. The assembly 81 which receives the coated containers in horizontal position from the turret of the automatic printing machine, as shown in the aforesaid application of Gladfelter and Hauger, Serial No. 342,568, filed June 26, 1940, will be described. This assembly comprises a sprocket chain 250, trained for movement in a vertical plane about sprockets 251, 252 journalled on horizontal stub shafts 253, 254 and driven by appropriate means, not shown. The chain carries a plurality of can-supporting brackets 255, pivoted about horizontal axes 256 on plates 257 carried by alternate links of the chain. The can-supporting brackets comprise outwardly projecting neck-end engaging members 258 and similarly projecting arcuate elements 259 adapted to engage and support the peripheries of the double seams at the bottom ends of the containers. Also, the brackets have rollers 260 journalled adjacent their outer ends and positioned to engage a cam track 261, which lifts the brackets from the horizontal, can-receiving position to the vertical, can-discharging position.

A guard rail 262 has an upper end portion 263 positioned substantially to contact the bottom end of the containers as they are received in the brackets. The rail is curved outwardly and downwardly, as indicated at 264, to follow the path of movement of the bottoms of the containers as they are tilted from the horizontal to the upright position. The rail extends downwardly as at 265 and passes between the pair of cables 60' which receive the cans and carry them to the lower tier of the second baking oven. Thus, the cam rail 261 swings the brackets upwardly from a horizontal to a vertical position and the guide rail 262 prevents inadvertent or premature release of the containers from the brackets and supports the containers until they are deposited firmly on the cables. The cam rail 261 and the guard rail 262 have inwardly projecting ends secured to the frame 270 or to the sprocket shaft supporting brackets 271, 272, as shown in Figures 19 and 20.

We claim:

1. In combination, two conveyors having adjacent horizontally disposed parallel runs, means for moving the conveyors in opposite directions, and means for transferring articles supported by one conveyor to the other, said means comprising an endless, flexible transfer conveyor, means for moving the same, and means for guiding the transfer conveyor for movement on a path inclined upwardly relative to the first conveyor at a point spaced from the delivery end thereof to lift articles therefrom, and then laterally toward and downwardly with respect to the second conveyor at a point spaced from the receiving end thereof to deposit articles thereon.

2. A conveyor comprising two pairs of horizontally disposed conveyor cables, means for moving one pair in one direction and the other in the opposite direction, and means for transferring articles supported by one pair to the other, said means comprising an endless, flexible transfer conveyor and means for guiding the same for movement on a path inclined upwardly relative to the first pair of cables at a point spaced from the delivery end thereof, to lift articles therefrom, then laterally toward, and downwardly relative to, the second pair of cables at a point spaced from the receiving end thereof to deposit the articles thereon.

3. In combination, two pairs of horizontally disposed, parallel conveyor cables, means for moving one pair in one direction and the other pair in the opposite direction, and means for transferring articles supported on one pair to to the other, said means comprising a transfer conveyor, driving means therefor, and means for guiding the transfer conveyor upwardly between the first pair of cables at a point spaced from the delivery end thereof to lift articles therefrom, laterally toward the second pair of cables and downwardly therebetween, to deposit articles thereon.

4. In combination, two pairs of horizontally disposed, parallel conveyor cables, means for moving one pair in one direction and the other pair in the opposite direction, and means for transferring articles supported on one pair of cables to the other, said means comprising a pair of sprockets, one disposed below the cables and the other thereabove, a chain trained about said sprockets and disposed in a plane inclined with respect to said cables, and means for rotating the sprockets and to move the chain upwardly between one pair of cables at a point spaced from the delivery end thereof to lift articles therefrom and downwardly between the second pair of cables at a point spaced from the receiving end thereof to deposit articles thereon.

5. In combination, two pairs of horizontally disposed, parallel conveyor cables, means for moving the pairs in opposite directions and a transfer table for transferring articles from one pair to the other, said table comprising two sprockets journalled on parallel axes inclined from the vertical, one disposed above the cables and the other therebelow, a chain trained about the sprockets and having one run passing between the cables of one pair and the other run passing between the cables of the other pair, and means for imparting continuous movement to the chain in the same direction as the adjacent cables, whereby the chain passing upwardly between one pair of cables lifts articles therefrom and deposits the same upon the other pair of cables.

6. Conveyor mechanism for a baking oven comprising a plurality of pairs of parallel conveyor cables, means for moving adjacent pairs of cables in opposite directions, and transfer assemblies adjacent the ends of the oven for transferring the articles from one pair of cables to the next, said assemblies each comprising an endless chain, means for continuously moving the chain, and means for guiding the chain on an inclined plane upwardly through one pair of cables at a point spaced from the delivery end thereof, laterally over the next pair and downwardly therebetween at a point spaced from the receiving end thereof.

7. Conveyor mechanism for a baking oven comprising a plurality of pairs of parallel conveyor cables, means for moving adjacent pairs of cables in opposite directions, and transfer assemblies adjacent the ends of the oven for transferring the articles from one pair of cables to the next, said assemblies comprising a transfer conveyor guided for movement on a plane inclined with respect to the plane of the cables and upwardly through one pair of cables at a point spaced from the delivery end thereof and downwardly through the next adjacent pair at a point spaced from the receiving end thereof, and means for moving the chain in the same direction as the cables.

8. Conveyor mechanism for a baking oven comprising a plurality of pairs of parallel conveyor cables, means for moving adjacent pairs of cables in opposite directions, and transfer assemblies adjacent the ends of the oven but spaced from the ends of the cables for transferring the articles from one pair of cables to the next, said transfer assemblies each comprising a pair of sprockets, one disposed above and the other below the cables, an endless chain trained about said sprockets and having one run movable in the same direction as, and inclined upwardly with respect to, one pair of cables, and another run movable in the same direction as, and inclined downwardly with respect to, the other pair of cables.

WILTIE I. GLADFELTER.
WILLIAM H. MOORE.